(12) United States Patent
Weiss et al.

(10) Patent No.: US 10,845,188 B2
(45) Date of Patent: Nov. 24, 2020

(54) MOTION CAPTURE FROM A MOBILE SELF-TRACKING DEVICE

(71) Applicant: Microsoft Technology Licensing, LLC, Redmond, WA (US)

(72) Inventors: John Weiss, Seattle, WA (US); Vivek Pradeep, Redmond, WA (US); Xiaoyan Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 14/987,999

(22) Filed: Jan. 5, 2016

(65) Prior Publication Data
US 2017/0193666 A1 Jul. 6, 2017

(51) Int. Cl.
*G01B 11/22* (2006.01)
*H04N 7/18* (2006.01)
(Continued)

(52) U.S. Cl.
CPC .............. *G01B 11/22* (2013.01); *G01B 11/14* (2013.01); *G06K 9/00335* (2013.01);
(Continued)

(58) Field of Classification Search
CPC ......... G06T 7/20; G06T 19/006; G06T 7/246; G06T 7/004; G06T 7/0051; G06T 17/20; G06T 2207/30241; G06T 2207/30204; G06T 2200/04; H04N 9/04; H04N 7/18; G06K 9/00335; G01B 11/22; G01B 11/14
See application file for complete search history.

(56) References Cited

U.S. PATENT DOCUMENTS

| 6,064,749 A | 5/2000 | Hirota et al. |
| 7,212,230 B2 | 5/2007 | Stavely |

(Continued)

FOREIGN PATENT DOCUMENTS

WO 2007136181 11/2007

OTHER PUBLICATIONS

Verplaetse, C., "Inertial proprioceptive devices: Self-motion-sensing toys and tools", In IBM Systems Journal, vol. 35, No. 3 & 4, Sep. 1, 1996, pp. 639-650.
(Continued)

*Primary Examiner* — Nasim N Nirjhar
(74) *Attorney, Agent, or Firm* — Ray Quinney & Nebeker, P.C.; Thomas M. Hardman; Gregg W. Wisdom

(57) ABSTRACT

Methods and apparatus for capturing motion from a self-tracking device are disclosed. In embodiments, a device self-tracks motion of the device relative to a first reference frame while recording motion of a subject relative to a second reference frame, the second reference frame being a reference frame relative to the device. In the embodiments, the subject may be a real object or, alternately, the subject may be a virtual subject and a motion of the virtual object may be recorded relative to the second reference frame by associating a position offset relative to the device with the position of the virtual object in the recorded motion. The motion of the subject relative to the first reference frame may be determined from the tracked motion of the device relative to the first frame and the recorded motion of the subject relative to the second reference frame.

21 Claims, 5 Drawing Sheets

(51) Int. Cl.
- *G06K 9/00* (2006.01)
- *H04N 9/04* (2006.01)
- *G01B 11/14* (2006.01)
- *G06T 7/246* (2017.01)

(52) U.S. Cl.
CPC ............... *G06T 7/246* (2017.01); *H04N 7/18* (2013.01); *H04N 9/04* (2013.01); *G06T 2207/30204* (2013.01); *G06T 2207/30241* (2013.01); *G06T 2207/30244* (2013.01)

(56) References Cited

U.S. PATENT DOCUMENTS

| | | |
|---|---|---|
| 7,239,752 B2 | 7/2007 | Neumann et al. |
| 8,150,143 B2 | 4/2012 | Chen et al. |
| 8,373,763 B2 | 2/2013 | Zhang et al. |
| 9,019,349 B2 | 4/2015 | Richardson |
| 2005/0035980 A1 | 2/2005 | Lonsing |
| 2005/0190972 A1 | 9/2005 | Thomas et al. |
| 2010/0253676 A1 | 10/2010 | Mumbaer |
| 2011/0007081 A1* | 1/2011 | Gordon ................... G06T 7/246 345/475 |
| 2011/0164116 A1 | 7/2011 | Gay |
| 2013/0215229 A1* | 8/2013 | Yerli .................. H04N 13/0207 348/46 |
| 2014/0249789 A1* | 9/2014 | White ..................... G01M 9/08 703/6 |
| 2016/0063709 A1* | 3/2016 | Booij .................... G06T 7/0042 348/142 |
| 2016/0267755 A1* | 9/2016 | Martinson ................ G08B 6/00 |
| 2016/0291160 A1* | 10/2016 | Zweigle .................. H04W 4/70 |
| 2019/0011921 A1* | 1/2019 | Wang .................... B64C 39/024 |

OTHER PUBLICATIONS

Zhang, Michael, "Lily is the World's First Throw-and-Shoot Camera", Published on: May 12, 2015 Available at: http://petapixel.com/2015/05/12/lily-is-the-worlds-first-throw-and-shoot-camera/.

Hornung, et al., "Self-Calibrating Optical Motion Tracking for Articulated Bodies", In IEEE Virtual Reality Conference, Mar. 12, 2005, 8 pages.

Jiang, et al., "Camera Tracking for Augmented Reality Media", In IEEE International Conference on Multimedia and Expo, Jul. 30, 2000, 4 pages.

"International search Report and Written Opinion" issued in PCT Application No. PCT/US2016/067063, dated Aug. 17, 2017, 22 pages.

"Office Action Issued in European Patent Application No. 16828825.6", dated Jul. 15, 2019, 8 Pages.

"Summons to Attend Oral Proceedings Issued in European Patent Application No. 16828825.6", Mailed Date: Apr. 20, 2020, 9 Pages.

\* cited by examiner

MOTION CAPTURE FROM A MOBILE SELF-TRACKING DEVICE

BACKGROUND

Video and film production often require that subject motion be recorded relative to a fixed coordinate system. The recorded subject motion may then be manipulated with reference to the fixed coordinate system when editing or creating scenes for the video or film. Current techniques for recording motion relative to a fixed coordinate system typically utilize two or more motion capture cameras to observe and capture motion in 3 dimensions. This reduces the chance that too few cameras get an unobstructed view of the subject's fiducial markers that are used to locate the subject relative to the cameras. Because the fiducial markers are located using triangulation, at least two cameras must have a clear view of each fiducial marker, and the location and orientation of each camera must be known in advance of recording. A calibration procedure must therefore be performed each time one of the cameras is moved. Often the cameras are mounted on heavy tripods to reduce the likelihood of being bumped and thus needing recalibration. In order to get clean data, motion recording is typically performed in a dedicated specialized studio space where there is enough room for all of the cameras and their tripods.

Because a specialized studio space is required, motion is typically recorded outside of the context in which it will be used. For example, to record motion capture data for a movie scene to be set in a small room, there would most likely be little space for the two or more traditional motion capture cameras. So an actor or other subject would need to produce motion in a studio space, with the studio space being a stand-in for the room. The recorded motion would then later be combined with scenes recorded in the room. This separation of context between studio and scene may cause errors which can be costly. Also, errors in the motion capture in a studio space may not be discovered until too late, for example when the motion of a subject recorded in the studio space conflicts with the actual layout of the movie scene.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide motion capture from a mobile self-tracking device are disclosed herein. The disclosed embodiments provide motion capture that utilizes a mobile self-tracking device configured to track its own motion relative to a first reference frame and also record motion of a subject relative to a second reference frame that is relative to the device. The first reference frame may be, for example, a reference frame based on a real world coordinate system. The tracked motion of the device may include device movement though different locations, as well as device orientation movement comprising tilting, rotating or turning as the device records motion. As the device moves in the first reference frame it records motion of a subject relative to the second reference frame, for example a reference frame based on a coordinate system relative to the device. The motion of the subject may be recorded as, for example, video or other motion images that create a recording that provides moving images or video of the subject. The motion of the subject relative to the first reference frame may then be determined by converting the recorded motion of the subject from the coordinates of the second reference frame to coordinates of the first reference frame using the recorded motion of the subject relative to the second reference frame of the device and the tracked motion of the device relative to the first reference frame.

In an implementation the subject may be a real object and the device may track device motion relative to the first reference frame and record a motion of the real object relative to the second reference frame. The device may track device motion, for example, by using sensor data to detect device motion and track points relative to the first reference frame. The motion of the real object may be recorded by determining the position of the real object relative to the device, for example by using sensors to determine subject marker location relative to the second reference frame which is relative to the device. The motion of the real object relative to the first reference frame may then be determined by converting the recorded motion of the real object from the coordinates of the second reference frame to coordinates of the first reference frame using the recorded motion data of the real object relative to the second reference frame of the device and the tracked motion data of the device relative to the first reference frame. Marker-less motion capture may also be used to record motion of a real object, for example the motion of a real object may also be recorded as a skeletal motion of the real object relative to the second reference frame. Data associated with the motion of the real object relative to the first and second reference frames may then be utilized for post-processing, for example, by editing and/or creating special effects in the recorded motion.

In other implementations, the subject may be a virtual object or a placeholder for a virtual object and the device may track device motion relative to the first reference frame and record a motion of the virtual object relative to the second reference frame. The motion of the virtual object may be recorded by associating a position that is offset relative to the device with a position of the virtual object in the recorded motion. The motion of the virtual object relative to the first reference frame may then be determined by converting the recorded motion of the virtual object from the coordinates of the second reference frame to coordinates of the first reference frame using the recorded motion data of the virtual object relative to the second reference frame of the device and the tracked motion data of the device relative to the first reference frame. Data associated with the motion of the virtual object relative to the first and second reference frames may then be utilized for processing of the recorded motion. For example, the processing of the recorded motion may include initiating a video recording of a playback of the recorded motion path of the virtual object with a virtual asset in place of the virtual object to create a special effects video. Other processing of the recorded motion may include, for example, creating a 3-Dimensional (3D) mesh on a surface in the recorded motion of the subject and initiating a deviation of the virtual asset from the recorded motion path in a video recording based on the 3D mesh.

DETAILED DESCRIPTION

Figure 1A:
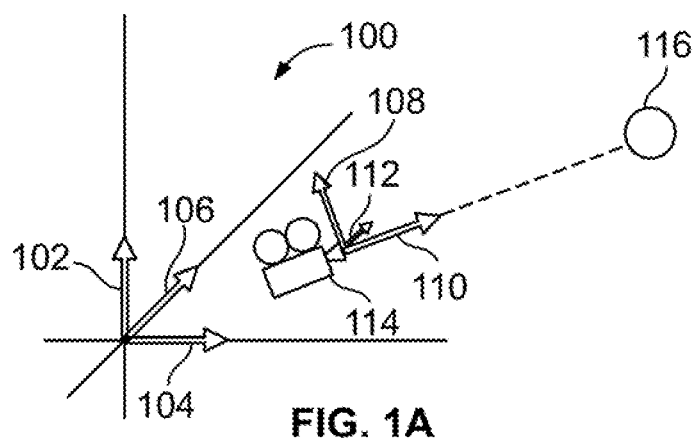
FIG. 1A is a diagram illustrating an example device and coordinate system for motion capture of a subject according to an embodiment of the disclosure.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus for motion capture from a mobile self-tracking device by tracking a motion of the device relative to a first reference frame and recording a motion of a subject relative to a second reference frame that is relative to the device.

Use of the embodiments provides numerous technical advantages. For example, only one self-tracking device is required to track the motion of a subject that may otherwise be obstructed from camera view due to movement in a studio using fixed camera positions. The self-tracking device of the embodiments may move with the subject in order that the view of the subject is never obstructed and motion recording can be performed in the spatial context in which it will be used. Motion recording can be performed in the temporal context in which it will be used. For example, motion can be recorded during an actual take. Bulky tripods are not required, as a small single device may capture motion within small areas or very large areas, for example by following motion throughout a building, around corners and in hallways. Additionally, because reference calibration of the self-tracking device is done automatically and constantly by the device itself, a user is not required to perform operations to calibrate or recalibrate cameras to determine their location and orientation relative to a reference frame. Due to the fact that the embodiments may require only one self-tracking device, not require calibration and not require a dedicated studio space, special effects film making may be made less expensive and more approachable to novices.

The embodiments of the disclosure improve upon motion capture that uses multiple static cameras that are located in a studio space and that must be carefully calibrated before motion recording. The advantages also prevent problems that may occur when using static cameras, in which obstructions may appear and block the view of a subject as the subject moves in a studio space. The embodiments also improve upon the technique known as match move that deduces camera motion based on red, green, blue (RGB) image data. Match move requires heavy post processing and only determines camera position and movement, not motion of a subject relative to a frame of reference associated with the camera itself.

Use of the embodiments also provides numerous technical advantages that allow enhanced video and film creation techniques. For example, because the self-tracking device can track its own position, motion of the device itself can be recorded without tracking a real external subject. In one example, the motion of a virtual object to be located at a positional offset from the camera position (e.g. 2 feet in front of the device) may be recorded without any object, or with only a placeholder for the virtual object, recorded in the motion. By recording the device motion footage independently, special effects can be combined with real-time graphics techniques and refined in post-production. Also, augmented reality techniques can be used to record special effects in real-time in combination with previously recorded camera motion footage. By showing a monitor of device footage to actors, actors can witness and react to artificial components in real-time.

Other advantages are provided by utilizing the self-tracking device to create a world-aligned (first reference frame-aligned) 3-Dimensional (3D)-mesh of environment surfaces at motion recording time. This allows special effects to be enhanced by using lighting and physics simulations and adding virtual objects to the recorded motion. For example, a physics engine can simulate a virtual rubber ball bouncing off of 3D geometry which is aligned to the real floor and walls of a room during motion capture. The self-tracking device provides a feedback mechanism for visualizing the virtual object in the real world scene and in the motion being recorded, for example in relation to the geometry of walls. With the self-tracking device feedback may be obtained without creating additional simulations and visualizations to represent the real-world context for the virtual objects.

In other implementations, multiple self-tracking devices may be used together to obtain enhanced motion recording data and enhanced coverage of subjects, including real objects and virtual objects.

Referring now to FIG. 1A, therein is a diagram illustrating an example device and coordinate system for motion capture according to an embodiment of the disclosure. FIG. 1A shows self-tracking device 114 for recording the motion of a subject 116. Device 114 is shown operating within an area 100 within which the location of device 114 may be defined relative to a first reference frame defined by the coordinate system having the axes shown by arrowed lines 102, 104 and 106 and having an origin at the point where the lines 102, 104 and 106 intersect. The axes shown by arrows 102, 104 and 106 may be relative to a fixed reference point such as the earth or world, a building interior, or any other environment in which device 114 may move. The first reference frame origin may be flexibly chosen. For example, it may be set on the floor in the center of a room, or in midair in the center of a room. However, the origin does not move with respect to stationary environment elements relative to which device location is tracked. In this disclosure the first reference frame may also be referred to as the world reference frame.

Device 114 is implemented to self-track and record its location within the first reference frame as it moves. As device 114 moves, or stays stationary, within the first reference frame it may record the motion of subject 116 relative to a second reference frame defined by the coordinate system having the axes shown by arrowed lines 108, 110, and 112 and having an origin relative to the device 114 where lines 108, 110, and 112 intersect. The motion may be recorded as a series of images or a video recording that provides images of subject 116 moving in the environment. Because it is relative to the device 114 the second reference frame may be referred to as a device reference frame. The terms "reference frame", "space", "frame of reference", or "coordinate system" as used in this disclosure describe abstract coordinate systems for specifying locations and may include coordinate systems having two or three orthogonal dimensions such as three-dimensional Euclidian space, or any reference system or for specifying locations that may be utilized in the embodiments.

Figure 1B:
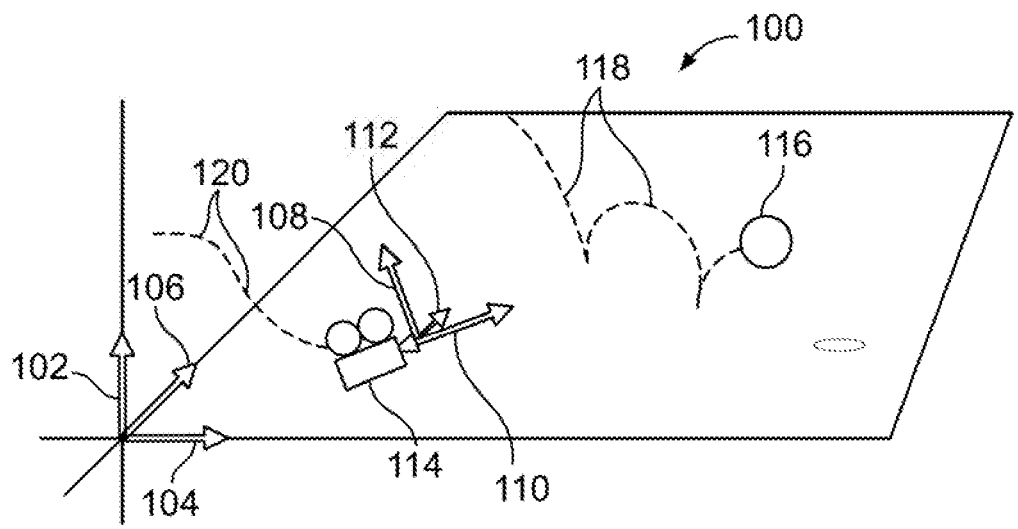
FIG. 1B is a diagram illustrating motion capture of an object using an example device and coordinate system.

FIG. 1B is a diagram illustrating motion capture of a subject using the example device 114 of FIG. 1A. In FIG. 1B device 114 is shown capturing motion of a real subject, such as the ball 116. The motion of ball 116 is recorded by device 114 as ball 116 bounces across area 100 following the path shown by dashed line 118. While recording the motion of ball 116, device 114 moves, both in its orientation and along the path shown by dotted line 120, and records the motion of ball 116 relative to the second reference frame (coordinate axes shown by arrows 108, 110, and 112). Device 114 also self-tracks its motion (orientation and location) relative to the first reference frame (coordinates axes shown by arrows 102, 104 and 106) while recording the motion of ball 116. When device 114 has recorded the motion of ball 116, the tracked motion of device 114 relative to the first reference frame and the recorded motion of ball 116 relative to the second reference frame may be stored within device 114 as data for further processing. Alternately, tracked device motion data and subject motion capture data may be transferred to other devices for processing.

Figure 1C:
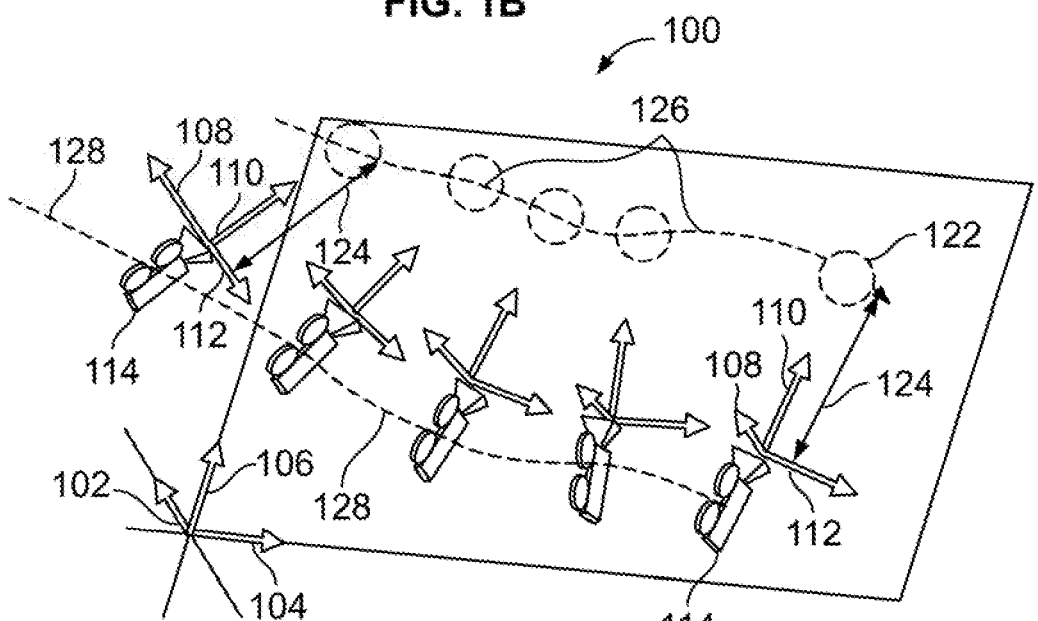
FIG. 1C is a diagram illustrating motion capture of a virtual object using an example device and coordinate system.

FIG. 1C is a diagram illustrating motion capture of a virtual subject using example device 114. In FIG. 1C device 114 is shown capturing motion for a virtual subject, such as the virtual subject depicted by the ball having dotted outline 122. The motion of the virtual subject may be recorded by defining a fixed reference point relative to device 114 that defines the motion path of the virtual subject as the device self-tracks and records subject motion. Moving the device in world space creates a corresponding movement of the virtual subject in world space. For example, the motion path of the virtual subject may be defined to be a distance "x", as shown by line 124, directly in front of device 114 on axis 110 in the second reference frame (coordinate axes shown by arrows 108, 110, and 112). Device 114 may be configured so that a user looking through a viewfinder of device 114 while capturing motion of a virtual subject would see a representation of a virtual object, a representation of a placeholder object, or another representation or image that indicates the position of the virtual object in the motion being recorded as device 114 moves. Alternately, the view finder may show no representation of any object and a user may be relied upon to orient device 114 to record a desired motion path for a virtual subject 122 by estimating the correct position of the virtual subject 122 during motion recording. In the example of FIG. 1C, the motion of virtual subject 122 may be recorded by moving device 114 both in its orientation and within area 100, along the path shown by dotted line 128, while maintaining the position of virtual subject as desired within a recorded motion. Device 114 also self-tracks its motion (orientation and location) relative to the first reference frame (coordinates axes shown by arrows 102, 104 and 106) while recording the motion of virtual subject 122. The position and rotation of the virtual subject 122 relative to the device 114 may be changed over time as well. When device 114 has recorded the motion of virtual subject 122 the tracked motion of device 114 relative to the first reference frame and the recorded motion of the virtual subject 122 relative to the second reference frame may be stored as data for further processing. The motion of virtual object 122 relative to the first reference frame may then be determined by converting the recorded motion of virtual object 122 relative to the second reference frame to motion relative to the first reference frame. This may be done by using the recorded motion of virtual object 122 relative to the second reference frame of device 114 and the self-tracked motion of device 114 relative to the first reference frame and converting motion of virtual object 122 to coordinates of the first reference frame. Data on the motion of virtual object 122 relative to the first reference frame may be used in post processing. In one example scenario, a user of device 114 could move and record motion, while device 114 self-tracks its motion, in order to plan the path of a subject to be added to the scene in post processing. The user may visualize a virtual subject in real-time using a display for augmented reality feedback. The virtual subject could always be a set distance, directly in front of device 114 and displayed in real size, so the user knows where the subject may travel in the recorded motion without colliding into walls or other obstructions. A user may also visualize a 3-D line in a display for the recorded path of motion. This motion path recording may then be utilized later for subject navigation in the recorded motion.

In FIGS. 1B and 1C, the movement of device 114 may be caused by a user manipulating and carrying device 114 as a portable device while recording the motion. In other implementations, the movement of device 114 may be caused by other methods, such as having device 114 attached to a movable robotic arm, having device 114 attached to a remotely controlled device such as a drone, or any other method of facilitating motion of device 114 while recording the motion of ball 116 or virtual subject 122. Also, it is possible that device 114 may remain stationary and not move along path 120 or 128, or not change orientation, during at least a portion of the motion capture period.

Figure 2A:
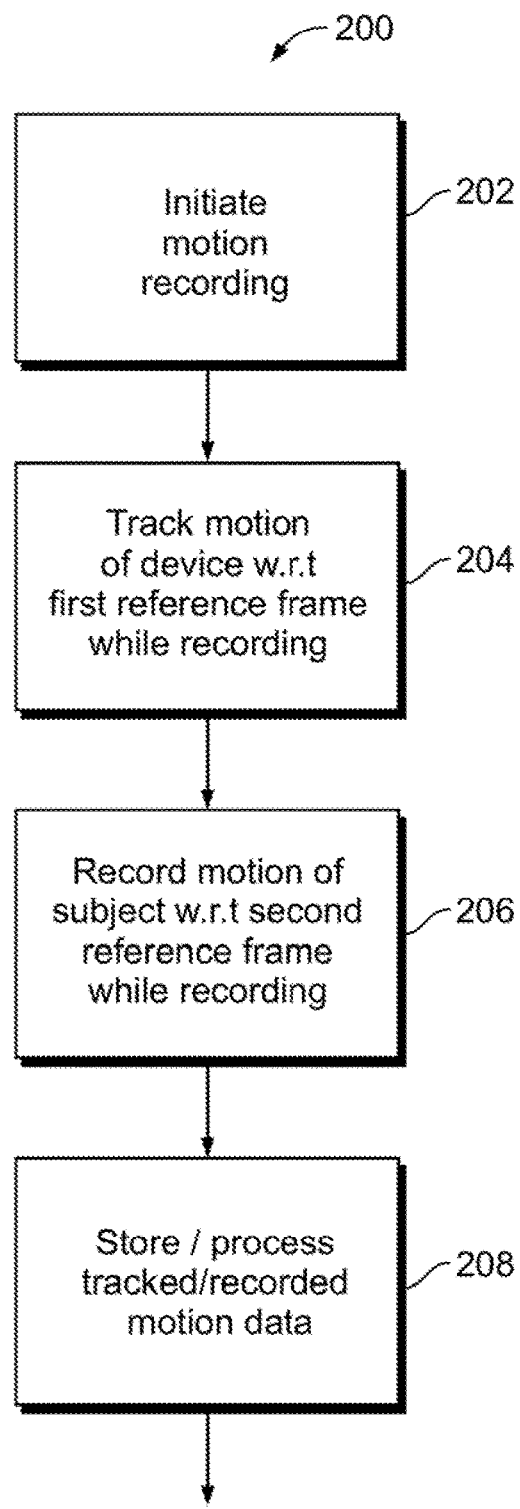
FIG. 2A is a flow diagram illustrating example operations for motion capture.

Referring now to FIG. 2A, therein is a flow diagram illustrating example operations for motion capture that may be performed by device 114 according to an embodiment. In an implementation device 114 may be configured with one or more processors and memory including code that perform the operations shown in FIG. 2A.

The process begins at 202 where the motion capture process is initiated. At 204, device 114 begins the operation of tracking the motion of itself (device 114) with relation to the first reference frame (world reference frame) while recording motion. The self-tracking of operation of 204 may be implemented in various ways. In one implementation, device 114 may include components providing the functions of a depth camera, a red, green, blue (RGB) camera and an inertial measurement unit (IMU). Device 114 may also include a display to visualize motion and implement augmented reality effects provided by the embodiments. Device 114 tracks its location and orientation relative to the first frame of reference by combining information from hardware sensors of the depth camera functions, the RGB camera functions, and the IMU functions to track stationary points of interest in the first reference frame as the device moves. The location and orientation of device 114 may be determined from tracking motion that comprises movement in position and orientation within six degrees of freedom; horizontal movement up and down, vertical movement left and right, vertical movement forward and backward, device tilting forward and backward, device turning left and right and device tilting side to side. Device 114 may receive data from hardware sensors of the depth camera function, from hardware sensors of the RGB camera function, and/or from hardware sensors of the IMU function and utilize the received data to detect the 3D location of fiducial markers of points of interest in the first reference frame. Device 114 may then build a 3D map of surroundings, and determine the location/orientation of computing device with respect to the first reference frame to self-track its motion.

At 206, device 114 also begins recording motion of a subject with relation to the second reference frame (device reference frame). This may be done simultaneous with operation 204. The motion recording of operation 206 may be implemented in various ways. In one implementation, device 114 may combine information from hardware sensors of the depth camera functions, the RGB camera functions, and the IMU functions of sensors to locate subject motion relative to the second reference frame. For example, the depth camera function of device 114 may provide depth images in which each pixel value encodes distances of objects from the camera. The 2D locations of pixels in the depth images may represent rays pointing outward from the camera location at known angles. When device 114 has data on the location of an object, or the fiducial marker for the object, in the 2D depth image, device 114 may determine the objects 3D location with respect to device 114, i.e., with respect to the second reference frame. In an example implementation, the 2D location of the fiducial marker of a subject may be determined by the use of retroreflector material as the marker and using a light source near a camera lens of device 114. The retroreflector material of the marker may be easy to distinguish in the image as the brightest reflection of the light source. Other fiducial marker types may also be used for detection. For example, markers that comprise tags with a recognizable pattern, or markers comprising three-dimensional objects that may be detected by using object recognition may be used.

At 206, when the motion recording is completed the tracked motion data and recorded motion data is stored. The stored data may be then processed as appropriate.

Figure 2B:
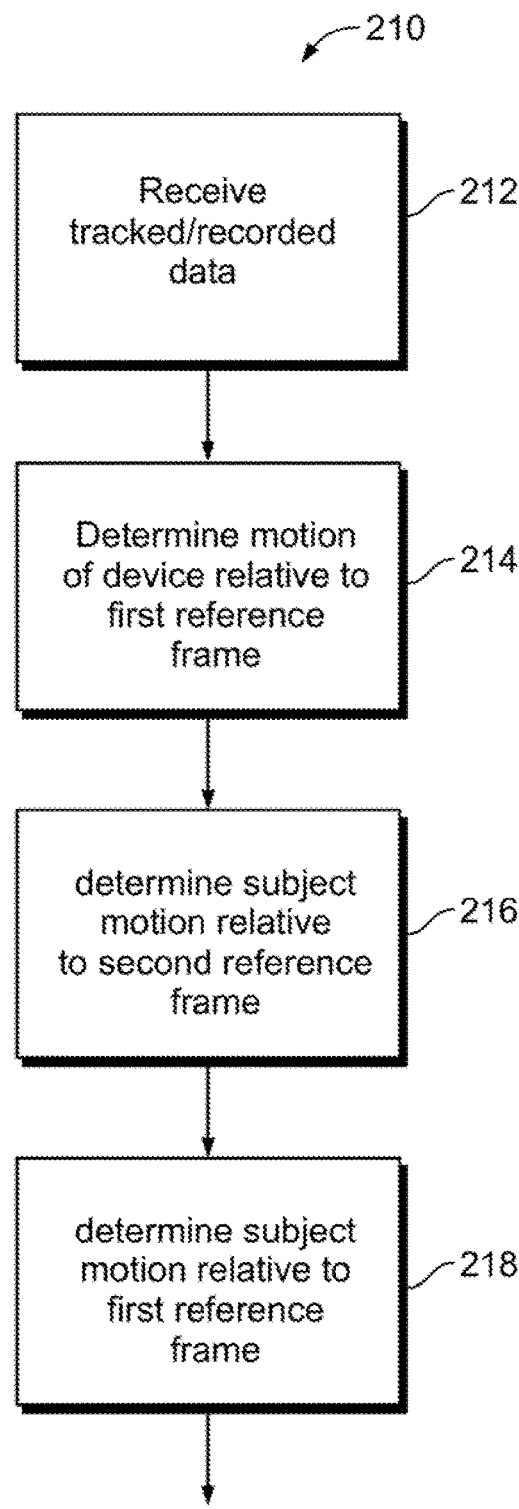
FIG. 2B is a flow diagram illustrating example operations for processing sensor data collected during motion capture.

Referring now to FIG. 2B, therein is a flow diagram illustrating example operations for processing sensor data collected during motion capture of FIG. 2A. The process of FIG. 2B illustrates the translation of recorded motion to the world reference frame. The process of FIG. 2B may be performed at device 114 concurrently with the process of FIG. 2A or when the process of FIG. 2A is completed. Alternately, the process of FIG. 2B may be performed by one or more processors in a device or devices separate from device 114.

At 212 the process receives the tracked/recorded data. At 214, the tracked motion (position and orientation) of device 114 relative to the first reference frame is determined. Because device 114 self-tracks its location/orientation, the 3D position and orientation of device 114 in first reference frame coordinates may be determined from data gathered at operation 204 of FIG. 2A. At 216, the subject location in the recorded motion relative to the second reference frame is determined. Because device 114 records the location of a subject, or fiducial marker of the subject, in the second reference frame relative to device 114, the subject location coordinates in the second reference frame may be determined from data gathered at operation 206 of FIG. 2A. Next at 218, the process determines the subject location relative to the first reference frame. Since the location of the subject relative to device 114 in the second reference frame is known, and the position and orientation of device 114 relative to the first reference frame is known, the operation at 218 may be performed by translating the subject location coordinates in the second reference frame to location coordinates of the first reference frame. In another implementation, the motion of the subject relative to any other appropriate third reference frame may be determined from the tracked motion of the device relative to the first frame and the recorded motion of the subject relative to the second reference frame. In this implementation, the third reference frame may be defined by location coordinates having a determinable relationship with the first reference frame. The location relative to the third reference frame may then be used for processing the data.

In other implementations device 114 may be configured to detect skeletal motion using marker less motion capture. In these implementations the skeletal motion may be recorded relative to the second reference frame while device 144 tracks its own location in the first reference frame. The tracking data and recorded motion may then be used in video post processing for example, for character motion editing or other types of special effects. Also, device 114 may include functions that are configured to generate a virtual 3D surface mesh that may be aligned with real world surfaces in the first reference frame. The surface mesh may be generated and utilized during motion capture or generated during post processing for special effects creation. The surface mesh provides data points in the captured motion that allow realistic effects using physics and lighting simulations. For example, game engine features may be used to create real-time special effects, including machinima, physics simulation, lighting simulation, and game controller input in the recorded motion based on 3D mesh data for the recorded motion.

In one implementation, device 114 may be implemented with the tracking functions, recording functions and any other functions for post-capture processing of the captured data to allow creation of videos and special effects videos using the one device 114. Device 114 may be implemented using any appropriate hardware or any type of computing device. For example, device 114 may be implemented as a dedicated camera device or on a mobile computing device, such as a tablet computing device or a smartphone with appropriately configured application software. In another implementation, device 114 may be implemented with only the self-tracking and motion recoding functions implemented into device 114. In this implementation the tracking and motion recording data may then be transferred to other devices for post-capture processing. In another example implementation all computing functions may be moved to a device separate from the motion capture device 114, with only the sensors on-board the device 114. Sensor data could be communicated to a remote computing device over wired, wireless, or storage media.

Figure 3A:
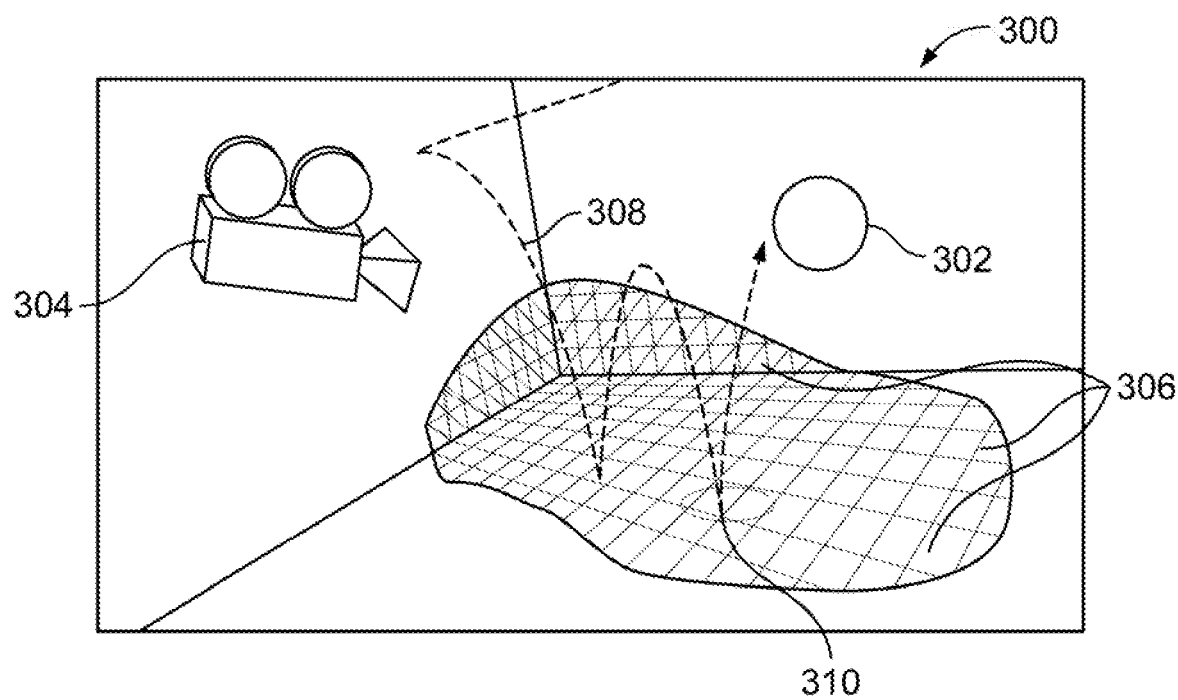
FIG. 3A illustrates example recording of motion of a virtual subject using a coordinate system with a 3 dimensional mesh.

Referring now to FIG. 3A, therein is illustrated an example of recording of motion of a subject using a coordinate system with a 3D mesh. When combining the described self-tracking device with game engine features and a world-aligned 3D mesh of environment surfaces, it is possible to record world-space motion created with simulated physics. For example, a physics engine can simulate a rubber ball bouncing off of 3D geometry which is aligned to the real floor and walls of a room during motion capture in the viewfinder of device 304. FIG. 3A illustrates a scenario similar to that of FIG. 1C but that also includes a 3D mesh rendered visually on surfaces of the first reference (world space) frame comprising walls and floor of room 300.

Device 304 self-tracks its motion in the first reference frame while recording motion of virtual ball 302. The scenario of FIG. 3A allows self-tracking device 304 to be used for receiving feedback that provides supervision and control of the motion of virtual subject 302 relative to mesh 306. This ensures that desired motion is captured and enables manipulation of virtual objects while recording their motion. Self-tracking device 304 as used in FIG. 3A enables viewing and controlling virtual subjects in the context of the real world.

Figure 3B:
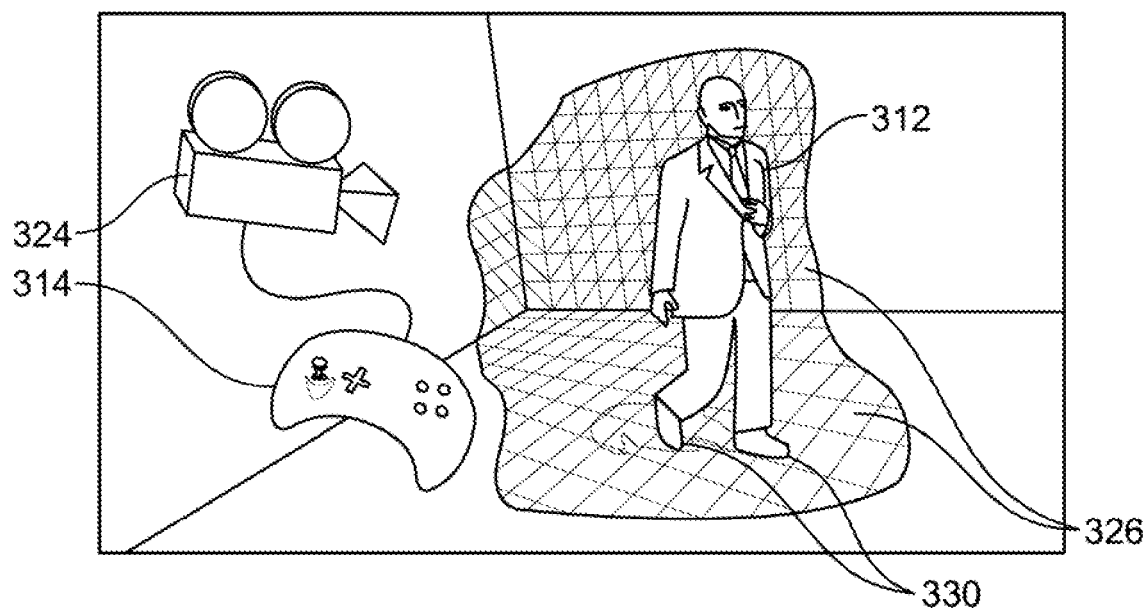
FIG. 3B illustrates another example recording of motion of a virtual subject using a coordinate system with a 3 dimensional mesh.

Referring now to FIG. 3B, therein is illustrated another example of the recording of motion of a virtual subject using a self-tracking device 324 and a coordinate system with a 3D mesh 326. When combining the self-tracking device 324 with a video game controller 314 and 3D mesh of environment surfaces 326, it is possible to record first reference frame (world space) motion of virtual actor 312 as it interacts with the real environment. FIG. 3B illustrates a scenario in which device 324 self-tracks its motion in the first reference frame while recording motion of virtual actor 312. Virtual actor 312 could be controlled by video game controller 314 or, alternately, by software within device 324 or in another device as it appears in the viewfinder of device 324. Virtual actor 312 may be aligned to the floor correctly by using a physics engine and 3D mesh 326. In this scenario the world-space position and rotation data of a virtual human character may be recorded as they walk down the halls of an actual building. The supervisory and control interactions using game controller 314 in the scenario of FIGS. 3A and 3B may be similar to controlling a remote-control object except that the object is virtual and can only be seen through the self-tracking device view finder. The remotely controlled object or subject may be any type of object, for example, a video game character. The object or subject can have any appropriate movement capabilities and forms.

Figure 4A:
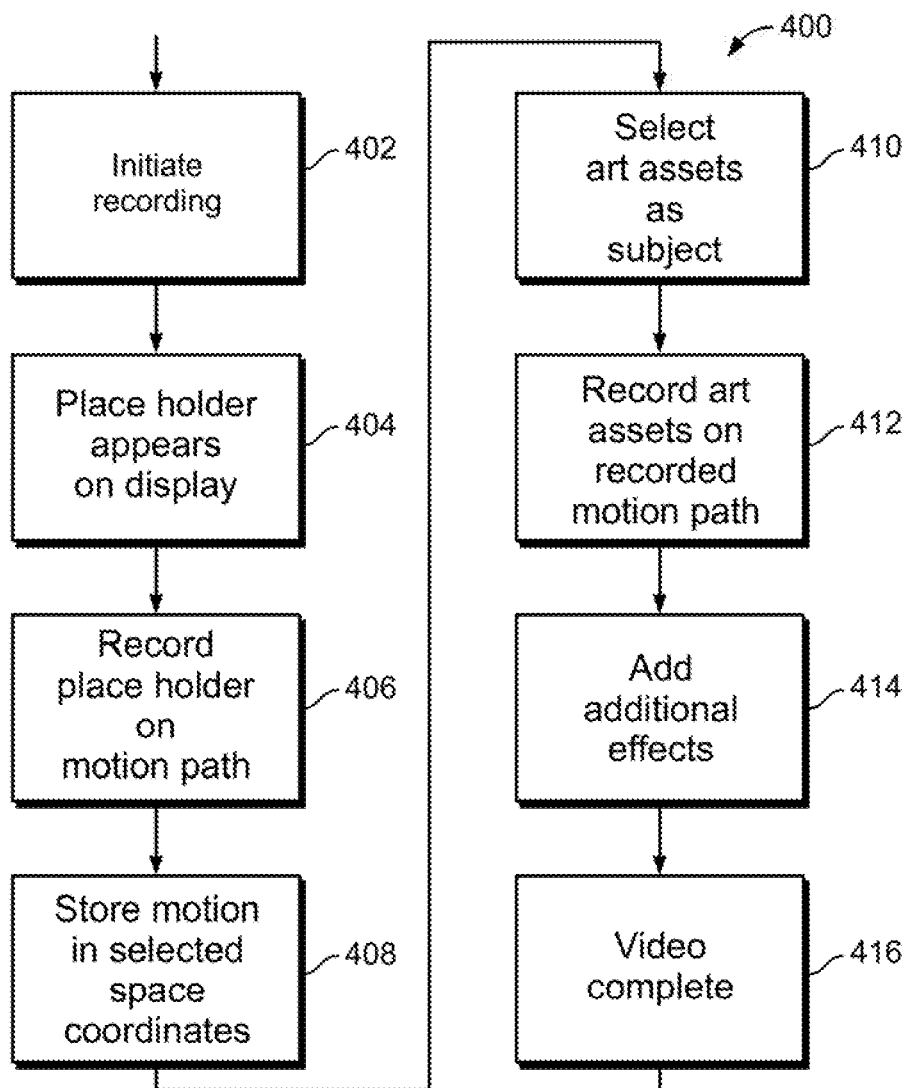
FIG. 4A is a flow diagram illustrating example operations for creating a special effects video according to an embodiment of the disclosure.

Referring now to FIG. 4A, therein is a flow diagram illustrating example operations 400 for creating a special effects video according to an embodiment of the disclosure. FIG. 4A illustrates how a self-tracking device, such as device 114 of FIG. 1A, may be utilized to create a video showing virtual objects that appear in motion relative to the first reference frame in which the device's motion is self-tracked.

The process begins at 402 where motion recording is initiated. The initiation of recording may include the self-tracking device initiating self-tracking tracking of its motion and initiating recording of the motion of a virtual object The device moves, or stays stationary, within the a reference frame, or world reference frame, it may record the motion of a virtual object relative to a second reference frame that is defined relative to the device. At 404 as the motion recording is initiated, a placeholder for the virtual object appears in the device viewfinder display. The placeholder indicates, visually in the viewfinder, the virtual object's position in the scene relative to the device as the device moves and records motion of the placeholder while it self-tracks its own motion. Next, at 406 the device records the motion of the place holder on a desired motion path. At 408, when motion recording is complete the recorded motion data may be stored in selected space coordinates. Since the location of the placeholder relative to the self-tracking device in the second reference frame is known, and the position and orientation of the device relative to the first reference frame is known, the operation at 408 may store the recorded motion data translating the virtual object location coordinates in the second reference frame to location coordinates of the first reference frame. Next, post processing of the recorded motion data may be performed. The post processing may be performed, for example, on self-tracking device itself or may be performed on another device to which the recorded motion data has been transferred.

At 410 an art asset is selected as the subject of the recorded motion. The art asset is a depiction of a virtual object which is selected to appear as the subject in the recorded motion. That is, the art asset is selected to appear in the recorded motion in the placeholder's position. Next, at 412, the recorded motion is played back with the art asset inserted as the subject and the playback is re-recorded with the art asset appearing in the recorded motion in place of the placeholder to create a video showing the virtual object in motion on the recorded motion path. At 414 additional effects may be added. For example, a 3D mesh may be added on surfaces within the first reference frame as described for FIGS. 3A and 3B, and the art asset may be controlled to perform an action relative to a portion of the mesh and related surface, such as deviate from the recorded motion path and fall to a floor or land on an object. At 416 the completed video with the virtual object and special effects added is complete.

Figure 4B:
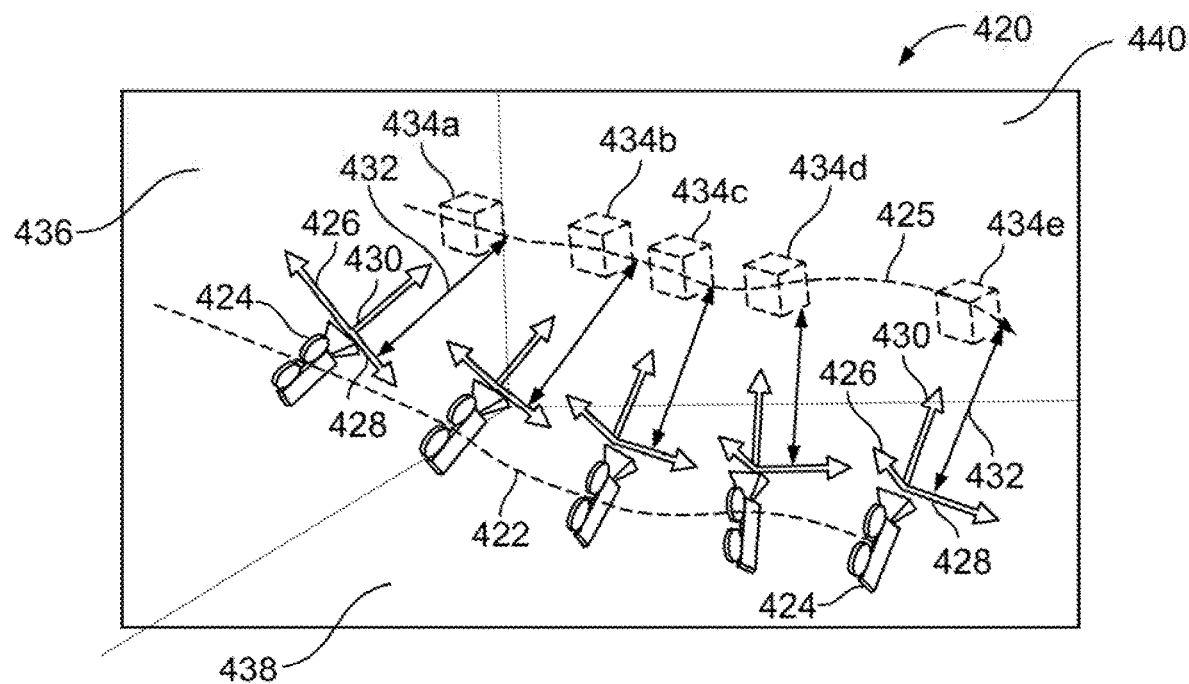
FIG. 4B is a diagram illustrating example motion capture of a virtual subject.

FIG. 4B is a diagram illustrating motion capture of a virtual subject according to an implementation of operations 402-408 of FIG. 4A. In FIG. 4B device 424 is shown capturing motion for a virtual subject using placeholder 434. Device 424 may be configured to track itself in a first or world reference frame. The world reference frame may have an origin relative to walls 436 and 440 and floor 438. Device 424 may also be configured so that a user looking through a viewfinder while capturing motion of a virtual subject using device 424 would see a representation of placeholder 434 to indicate the position of the virtual object in the motion being recorded. Moving device 424 in world space creates a corresponding movement of the placeholder 434 in world space. The placeholder 434 may be defined to be a distance "x", as shown by line 432, directly in front of device 424 on axis 430 in a second reference frame defined by coordinate axes 426, 428, and 430 relative to device 424. A user may move device 424 left to right along path 422 to record a desired motion along path 425. As device 424 moves along path 422 the corresponding position of placeholder 434 moves through positions 434a-434e along path 425 over time as the motion is captured. The motion captured is continuous over the path 425. When device 424 has finished motion capture of placeholder 434 the tracked motion of device 424 relative to the first reference frame and the recorded motion of the placeholder 434 relative to the second reference frame may be stored as data for further processing. The motion of placeholder 434 relative to the first reference frame may then be determined by converting the recorded motion of the placeholder relative to the second reference frame to motion relative to the first reference frame.

Figure 4C:
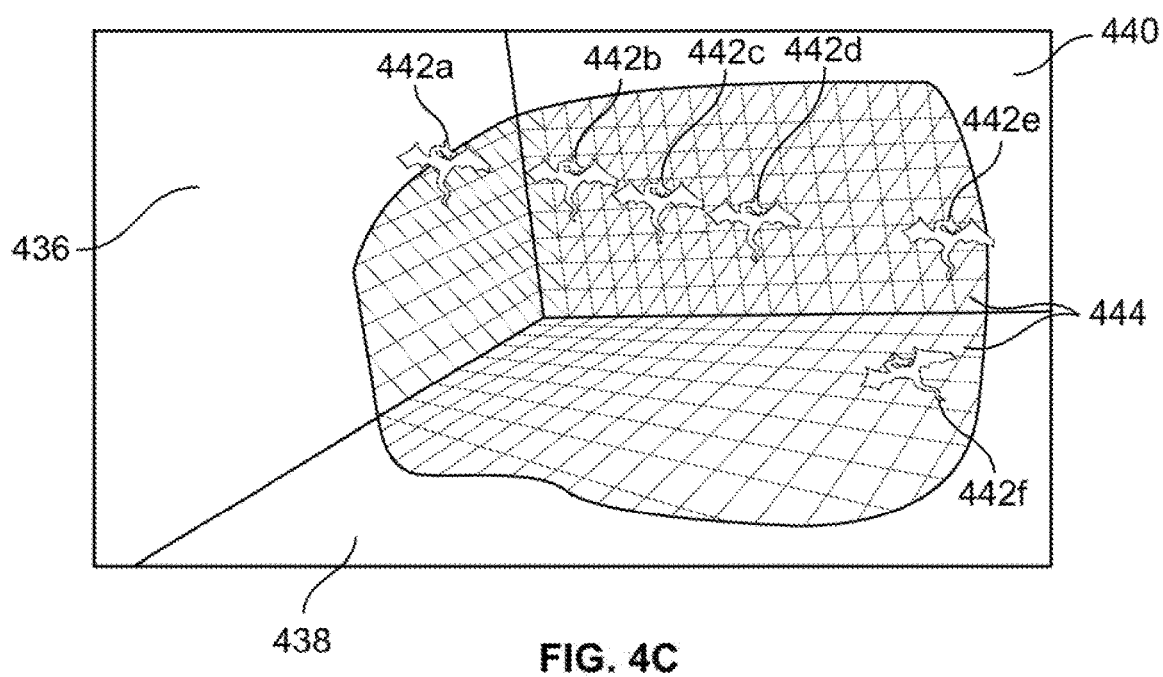
FIG. 4C is a diagram illustrating example virtual object motion created for a special effect video; and, FIG. 5 is a simplified block diagram of an implementation of an example device for motion capture.

The data from the motion capture scenario illustrated in FIG. 4B may be processed as described for post motion capture operations 410 to 416 of FIG. 4A. By inserting an art asset or virtual object in the position of placeholder 434 during playback of the recorded motion and adding a 3D mesh on surfaces in the world reference frame, a final version of a video may be created. FIG. 4C is a diagram illustrating how example virtual object motion captured in the scenario of FIG. 4B may appear in a final version of a video. FIG. 4C shows virtual object 442 as it would appear in positions 442a-442e sequentially over 5 snapshots in time as the completed motion video would be played. The motion would appear continuous as the video would be played. The virtual positions 442a-442e of the virtual object each correspond to the positions 434a-434e of the placeholder in the recorded motion. An example of a special effect has been added where the virtual object falls from position 442e to position 442f on the floor 438, where the floor is defined by mesh 444. Mesh 444 has been shown for illustrative purposes and may or may not be actually visible in the completed video but is used for positioning the special effects.

In some implementations a lower-capability self-tracking device may be used to perform motion recording and provide placeholder or positional feedback for virtual subjects and their context in video. For example, lower capability may mean that a certain mobile phone may not be capable of doing the real-time rendering and physics simulation required for desired virtual object insertion effects. In these implementations the virtual objects may be composited with the motion recording at a later time. For example, the compositing may be deferred to be performed later on a more powerful or capable device, for example using cloud computing. An example scenario may comprise the operations of a user recording motions of virtual objects on a low-capability device, the user recording an intermediate video on the low capability device with a simplified, lower-detail preview of virtual objects, the user uploading information for creating a final, more detailed composite video to the cloud or a desktop machine which is more capable, and remotely creating a final composite with highly detailed effects.

In further implementations, the user may want to use a device having better camera capabilities for the final video than the device used for providing virtual object feedback and motion recording. In one example scenario, a user may mount the lower-capability device to the device having better camera capabilities, or alternately mount the device having better camera capabilities to the lower capability device, as long as the two devices don't move relative to each other. The difference in camera perspectives between the two devices may be derived and rendering of 3D virtual content can be generated with the correct perspective device having the better camera capability. In this context, the world coordinate positions of the self-tracking lower capability device during the final video 'take' is valuable information and should be recorded. The perspective matrix needed to render the virtual 3D content into the perspective of the device having the better camera capability would depend on the relative positions of the two devices.

Figure 5:
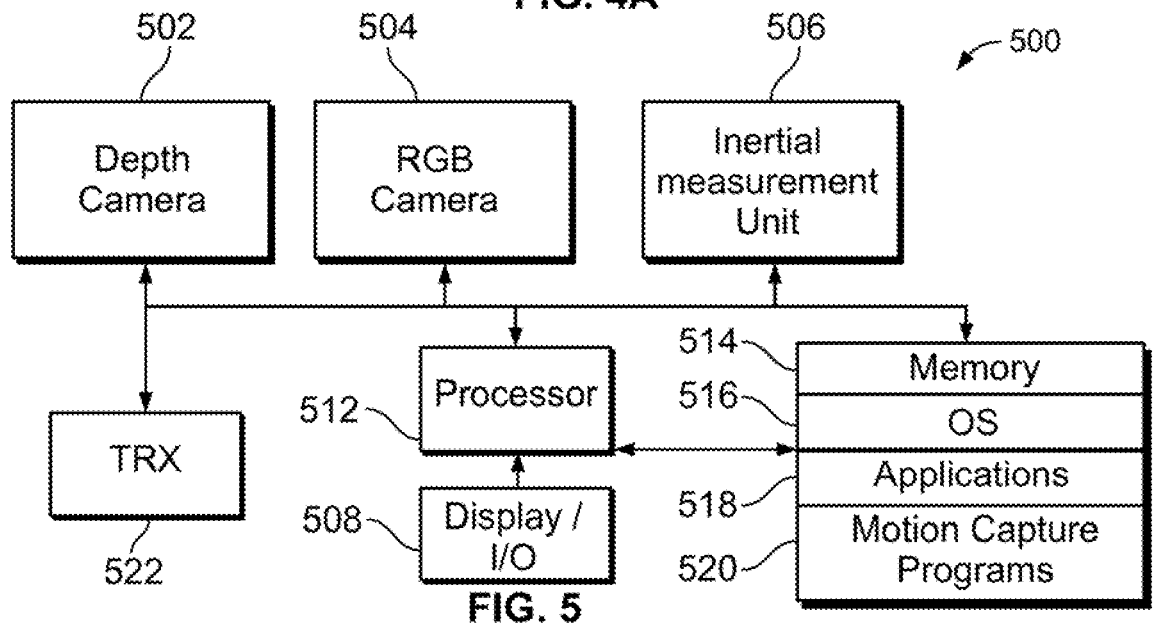

Referring now to FIG. 5 therein is a simplified block diagram of an example implementation of a self-tracking device 500. Device 500 represents a possible implementation of the devices described in the embodiments of this disclosure. Device 500 may include a display and input/output (I/O) 508 that provides an interface for a user. Display and I/O 508 may include, for example, a touch screen or keypad, a microphone, speakers, or other I/O functions which receive inputs and provide outputs to and from a user of device 500. Device 500 includes processor 512 and memory/storage 514 which is shown as including computer program code or instructions for motion capture programs 520. Device 500 also includes sensor functions provided by depth camera 502, RGB camera 504, and inertial measurement unit (IMU) 506. Depth camera 502, RGB camera 504, and inertial measurement unit (IMU) 506 provide the data used for self-tracking the motion of device 500 in the first world reference frame and recording the motion of a subject relative to the second device reference frame. Device 500 may also include wireless transceiver (TRX) 522. TRX 522 may be a Wi-Fi transceiver used for transferring data between device 500 and other devices as appropriate. For example, in certain implementations one or more or the operations of the embodiments may be performed remotely from device 500. In an implementation, when executed, motion capture programs 520 cause processor 512 to control device 500 to implement self-tracking and motion capture by performing the processes of FIGS. 2A and 2B. In other implementations, motion capture programs 520 may also cause processor to control device 500 to implement operations for creation of special effects video of the process of FIG. 4A. Memory 514 also includes code or instructions for the device operating system (OS) 516 and other device applications 518.

Memory 514 may be implemented as any type of computer readable storage media in device 500, including non-volatile and volatile memory. Memory 514 may be used to store data generated during self-tracking of the motion of device 500 and recording of motion of a subject. Memory 514 also may include data such as media data, camera photos and videos, contact data, calendar data, and other files used in the operation of applications on device 500. Processing unit 512 may comprise one or more processors, or other control circuitry or any combination of processors and control circuitry. Processing unit 512 provides overall control of device 500 and the other functional blocks shown in FIG. 5 by executing instructions or code in memory 514 to provide necessary functions for operation of device 500 according to the disclosed embodiments.

The functions shown in FIG. 5 may be implemented in a dedicated camera device or in a device, such as a laptop computer, a tablet computing device or smartphone that also has other capabilities in addition to the illustrated functions. Any device with the capability to receive the self-tracking and subject motion recording data and/or post process the data may be used to implement the embodiments. Various implementations of devices, according to the embodiments may include more or less functions than those shown in FIG. 5.

The example embodiments disclosed herein may be described in the general context of processor-executable code or instructions stored on memory that may comprise one or more computer readable storage media (e.g., tangible non-transitory computer-readable storage media such as memory 514). As should be readily understood, the terms "computer-readable storage media" or "non-transitory computer-readable media" include the media for storing of data, code and program instructions, such as memory 514, and do not include portions of the media for storing transitory propagated or modulated data communication signal.

The disclosed embodiments include a device comprising at least one processor and memory including code. When executed the code causes the at least one processor to control the device to track a motion of the device relative to a first reference frame and, record a motion of a subject relative to a second reference frame, wherein the second reference frame is relative to the device. The subject may a virtual object and the code may be executable to cause the at least one processor to control the device to record a motion of a subject by controlling the device to record a motion of the virtual object relative to the second reference frame by associating a position that is offset relative to the device with the position of the virtual object in the recorded motion. The code may be executable to cause the at least one processor to further control the device to determine the motion of the subject relative to the first reference frame from the tracked motion of the device relative to the first frame and the recorded motion of the subject relative to the second reference frame. The code may also be executable to cause the at least one processor to further control the device to determine the motion of the subject relative to a third reference frame from the tracked motion of the device relative to the first frame and the recorded motion of the subject relative to the second reference frame, the third reference frame having a determinable relationship with the first reference frame.

The subject also may be a real object and the code may be executable to cause the at least one processor to control the device to record a motion of a subject by controlling the device to record a skeletal motion of the real object relative to the second reference frame. The subject may be a real object and the code may executable to cause the at least one processor to control the device to record a motion of a subject by controlling the device to record a motion of the real object relative to the second reference frame by utilizing at least one marker. The code may be executable to further cause the at least one processor to control the device to create a 3D mesh on a surface in the recorded motion of the subject. The subject may be a virtual object and the code may be executable to further cause the at least one processor to control the device to initiate a video recording of a playback of the recorded motion path of the subject with a virtual asset in place of the virtual object. The code may be executable to further cause the at least one processor to control the device to create a 3D mesh on a surface in the recorded motion of the subject and initiate a deviation of the virtual asset from the recorded motion path of the subject in the video recording based on the 3D mesh.

The disclosed embodiments also include a device that further comprises at least one sensor, coupled to the processor, to generate at least one data signal, wherein the code is executable to further cause the at least one processor to control the device to track the motion of the device relative to the first reference frame utilizing first data from the at least one data signal, and, record the motion of the subject relative to the second reference frame utilizing second data from the at least one data signal. The at least one sensor may comprise a depth camera to generate a depth data signal, an RGB camera to generate a RGB data signal and, an inertial measurement unit to generate an inertial data signal.

The disclosed embodiments further include a method, comprising tracking, at a device, a motion of the device relative to a first reference frame and recording, from the device, a motion of a subject relative to a second reference frame, wherein the second reference frame is relative to the device. The recording may comprise recording a motion of a virtual object relative to the second reference frame by associating a position offset relative to the device with a position of the virtual object in the recorded motion. The method may further comprise determining the motion of the subject relative to the first reference frame from the tracked motion of the device relative to the first frame and the recorded motion of the subject relative to the second reference frame. The method may also further comprise determining the motion of the subject relative to a third reference frame from the tracked motion of the device relative to the first frame and the recorded motion of the subject relative to the second reference frame, the third reference frame having a determinable relationship with the first reference frame. The subject may be a virtual object and the method may further comprise initiating a video recording of a playback of the recorded motion path of the subject with a virtual asset in place of the virtual object. The method may also further comprise creating a 3D mesh on a surface in the recorded motion of the subject and initiating a deviation of the virtual asset from the recorded motion path of the subject in the video recording based on the 3D mesh.

The disclosed embodiments also include an apparatus comprising an input and a circuit in communication with the input, the circuit configured to receive first data comprising self-tracking motion data of a device relative to a first reference frame, receive second data recorded at the device, the second data comprising motion data of a subject relative to a second reference frame, wherein the second reference frame is a reference frame relative to the device and, determine the motion of the subject relative to the first reference frame from the first and second data. The device may comprise at least one sensor that generates the first and second data and the at least one sensor may include at least one camera and an inertial measurement unit. The apparatus and device may be integrated into a portable unit or the device may be a portable unit and the apparatus may be implemented separately from the device.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry, circuit, or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A single, portable device comprising:
a plurality of sensors;
at least one processor coupled to the plurality of sensors; and
memory coupled to the at least one processor, the memory including code, which when executed causes the at least one processor to control the device to:
generate first data associated with one or more locations of the device from a first at least one sensor of the plurality of sensors;

track a motion of the device relative to a first reference frame based on the first data, wherein the first reference frame comprises a first three-dimensional coordinate system relative to an environment;

generate second data associated with a subject from a second at least one sensor of the plurality of sensors;

record a motion of the subject in the environment relative to a second reference frame as the subject moves relative to the first reference frame and as the device moves to track at least a portion of the motion of the subject by action of a user, the motion of the subject in the environment relative to the second reference frame being recorded based on the second data, wherein the second reference frame comprises a second three-dimensional coordinate system relative to the device;

create a 3D mesh on a surface in a video of the recorded motion of the subject; and control a virtual asset in the video to deviate from the recorded motion of the subject based on the 3D mesh.

2. The single, portable device of claim 1, wherein the subject is a virtual object and the code is executable to cause the at least one processor to control the device to record the motion of the subject by controlling the device to:

record a motion of the virtual object in the environment relative to the second reference frame based on the second data by associating a position that is offset relative to the device with one or more locations of the virtual object in the recorded motion of the virtual object.

3. The single, portable device of claim 1, wherein the code is executable to cause the at least one processor to further control the device to:

determine a motion of the subject relative to the first reference frame from the tracked motion of the device relative to the first reference frame and the recorded motion of the subject relative to the second reference frame.

4. The single, portable device of claim 1, wherein the code is executable to cause the at least one processor to further control the device to:

determine a motion of the subject relative to a third reference frame from the tracked motion of the device relative to the first reference frame and the recorded motion of the subject relative to the second reference frame, the third reference frame having a determinable relationship with the first reference frame.

5. The single, portable device of claim 1, wherein the subject is a real object and the code is executable to cause the at least one processor to control the device to record the motion of the subject by controlling the device to:

record a skeletal motion of the real object in the environment relative to the second reference frame based on the second data.

6. The single, portable device of claim 1, wherein the subject is a real object and the code is executable to cause the at least one processor to control the device to record the motion of the subject by controlling the device to:

record a motion of the real object in the environment relative to the second reference frame based on the second data by utilizing at least one marker.

7. The single, portable device of claim 1, wherein the subject is a virtual object and the code is executable to further cause the at least one processor to control the device to:

generate the video by recording of a playback of the recorded motion of the subject with the virtual asset in place of the virtual object.

8. The single, portable device of claim 1, wherein the plurality of sensors comprises:

a depth camera to generate a depth data signal;
an RGB camera to generate a RGB data signal; and,
an inertial measurement unit to generate an inertial data signal.

9. A method comprising:

generating first data associated with one or more locations of a device from a first at least one sensor of a plurality of sensors on the device, wherein the device is a single, portable device that a person can carry;

tracking, at the device, a motion of the device relative to a first reference frame based on the first data, wherein the first reference frame comprises a first three-dimensional coordinate system relative to an environment;

generating, at the device, second data associated with a subject from a second at least one sensor of the plurality of sensors on the device;

recording, from the device, a motion of the subject in the environment relative to a second reference frame as the subject moves relative to the first reference frame and as the device moves to track at least a portion of the motion of the subject by action of a user, the motion of the subject in the environment relative to the second reference frame being recorded based on the second data, wherein the second reference frame comprises a second three-dimensional coordinate system relative to the device;

determining a motion of the subject relative to the first reference frame from the tracked motion of the device relative to the first reference frame and the recorded motion of the subject relative to the second reference frame;

generating a video of the recorded motion of the subject relative to the second reference frame with a virtual asset in place of the subject;

creating a 3D mesh on a surface in the video; and
initiating a deviation, in the video, of the virtual asset from the recorded motion of the subject relative to the second reference frame based on the 3D mesh.

10. The method of claim 9 wherein the subject is a virtual object and the recording the motion of the subject in the environment relative to the second reference frame comprises:

recording a motion of the virtual object in the environment relative to the second reference frame based on the second data by associating a position offset relative to the device with one or more locations of the virtual object in the recorded motion of the virtual object.

11. The method of claim 9 further comprising:

determining a motion of the subject relative to a third reference frame from the tracked motion of the device relative to the first reference frame and the recorded motion of the subject relative to the second reference frame, the third reference frame having a determinable relationship with the first reference frame.

12. The method of claim 9 wherein the subject is a virtual object and generating the video comprises recording a playback of the recorded motion of the subject with the virtual asset in place of the virtual object.

13. An apparatus comprising:

an input; and a circuit in communication with the input, the circuit configured to:
  receive first data comprising one or more self-tracked locations of a device relative to a first reference frame, wherein the first reference frame comprises a first three-dimensional coordinate system relative to an environment and wherein the device is a dedicated camera device or a mobile computing device;
  receive second data recorded at the device, the second data comprising recorded motion of a subject relative to a second reference frame, wherein the second reference frame comprises a second three-dimensional coordinate system relative to the device, and wherein the recorded motion of the subject was recorded while the device moved to track at least a portion of the recorded motion of the subject by action of a user;
  determine a motion path of the subject relative to the first reference frame from the first and second data;
  generate a motion path of a virtual asset in the environment by inserting the virtual asset in place of the subject in the motion path of the subject;
  generate a video of motion of the virtual asset in the environment based on the motion path of the virtual asset;
  create a 3D mesh on a surface in the video; and
  initiate a deviation of the virtual asset from the recorded motion of the subject in the video based on the 3D mesh.

14. The apparatus of claim 13 wherein the subject comprises a virtual object.

15. The apparatus of claim 13 wherein the subject comprises a real object.

16. The apparatus of claim 13 wherein the apparatus and the device are integrated into a portable unit.

17. The apparatus of claim 13 wherein the device is a portable unit and the apparatus is implemented separately from the device.

18. The apparatus of claim 13 wherein the first data and the second data are received via the input.

19. The single, portable device of claim 1, wherein the action of the user comprises manipulating and carrying the device.

20. The method of claim 9, wherein the action of the user comprises manipulating and carrying the device.

21. The apparatus of claim 13, wherein the action of the user comprises manipulating and carrying the device.

* * * * *